United States Patent
Lablans

(10) Patent No.: US 7,277,030 B2
(45) Date of Patent: *Oct. 2, 2007

(54) SEQUENCE DETECTION BY MULTI-VALUED CODING AND CREATION OF MULTI-CODE SEQUENCES

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/407,496

(22) Filed: Apr. 20, 2006

(65) Prior Publication Data

US 2006/0187092 A1    Aug. 24, 2006

Related U.S. Application Data

(63) Continuation of application No. 11/141,336, filed on May 31, 2005, now Pat. No. 7,064,684.

(60) Provisional application No. 60/668,355, filed on Apr. 5, 2005, provisional application No. 60/575,948, filed on Jun. 1, 2004.

(51) Int. Cl.
*H03M 5/16* (2006.01)
(52) U.S. Cl. .......................................... 341/57; 341/50
(58) Field of Classification Search .............. 341/5–10, 341/50–70
See application file for complete search history.

(56) References Cited

U.S. PATENT DOCUMENTS 6,559,779 B2 *   5/2003   Noda et al. .................... 341/58
6,891,483 B2 *   5/2005   Noda et al. .................... 341/58

* cited by examiner

*Primary Examiner*—Lam T. Mai
(74) *Attorney, Agent, or Firm*—Glen M. Diehl; DiehlServilla LLC

(57) ABSTRACT

Methods and apparatus for coding binary and multi-value sequences into higher value sequences are disclosed. Correlation methods for comparing lower-value sequences by first coding to higher value sequences and then calculating a correlation number are also disclosed. Methods and apparatus for resetting the coding rule during multi-value coding are also disclosed.

13 Claims, 12 Drawing Sheets

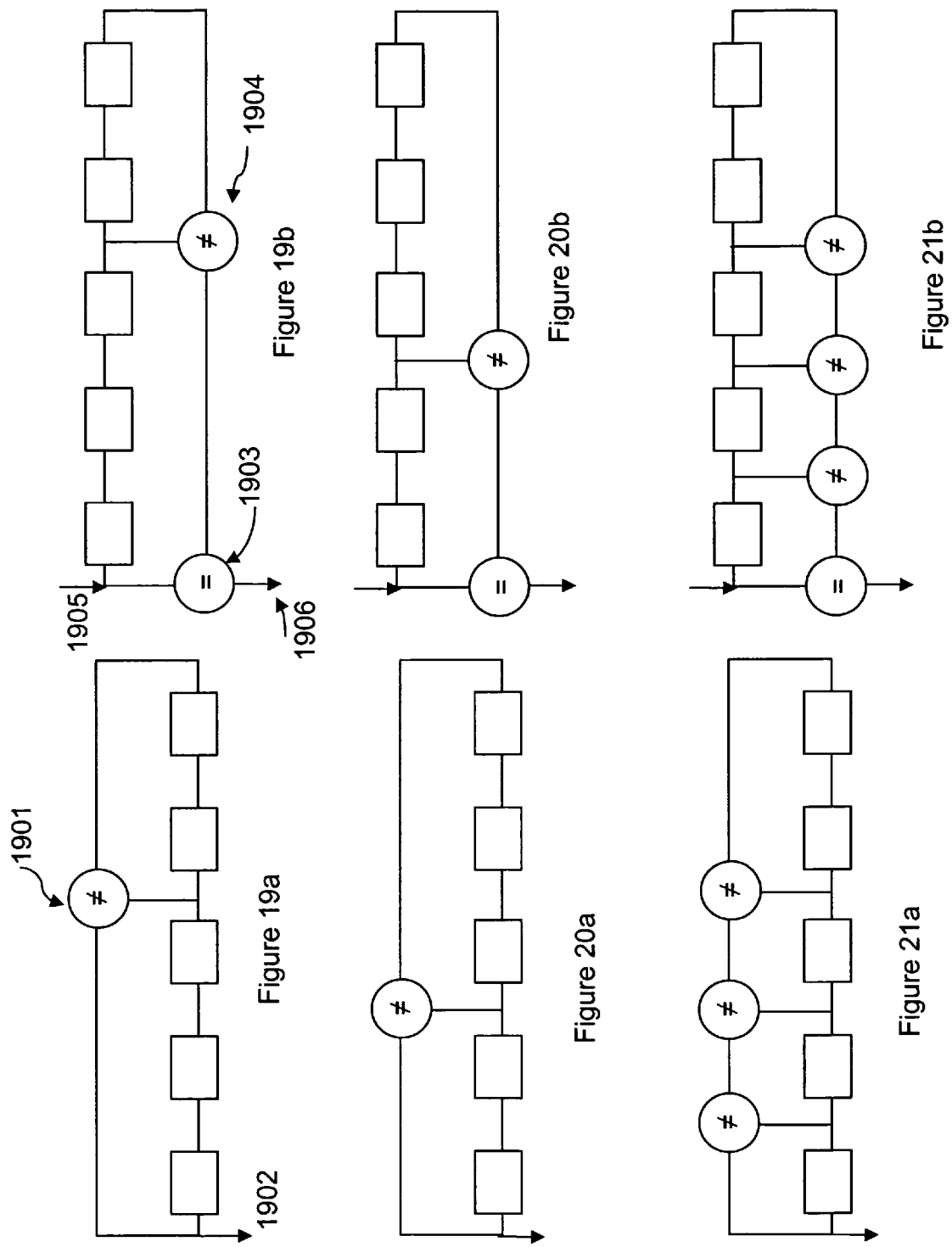

SEQUENCE DETECTION BY MULTI-VALUED CODING AND CREATION OF MULTI-CODE SEQUENCES

STATEMENT OF RELATED CASES

This application is a continuation of U.S. patent application Ser. No. 11/141,336 filed on May 31, 2005, now U.S. Pat. No. 7,064,684 issued on Jun. 20, 2006 entitled SEQUENCE DETECTION BY MULTI-VALUED CODING AND CREATION OF MULTI-CODE SEQUENCES which claims the benefit of U.S. Provisional Patent Application No. 60/575,948, filed on Jun. 1, 2004, entitled MULTI-VALUE CODING OF SEQUENCES AND MULTI-VALUE MEMORY DEVICES and U.S. Provisional Patent Application No. 60/668,355, filed Apr. 5, 2005, entitled IMPROVED SEQUENCE DETECTION BY MULTI-VALUE CODING, all of which are incorporated herein fully by reference.

BACKGROUND OF THE INVENTION

The present invention relates to the creation, coding, processing and detection of sequences comprised of binary and multi-value digital (non-binary) symbols. One aspect of the present invention relates to improved detection of sequences as well as the improved distinguishing between sequences.

Another aspect of the invention relates to the creation of signals wherein individual sequences represent one of n symbols with n an integer greater than 2.

The present invention has application in telecommunication systems, control systems and other applications. A specific example of where the present invention has utility includes spread-spectrum technologies in the transmission and the detection of data signals.

The present invention relates to multi-valued coding of sequences. A sequence is a series of digital symbols which can be represented in a signal consisting of separate elements or symbols (sometimes called chips) with discrete and distinguishable values. For the purpose of simplicity discrete values of signals will be represented here as numbers with origin 0 or as amplitude of a signal. It should be clear that other physical properties, for example a pulse position or the phase of a carrier signal or the polarization of a carrier signal can be used to represent the discrete elements in a sequence. It should also be clear that representation of the symbols as numbers is for convenience only.

In current applications of spread spectrum technologies used for the transmission of signals, such as in wireless communications, a digital data symbol is translated into a sequence consisting of a certain number of binary symbols. The transmission of the sequence will usually be achieved in the same time as the duration of the original data symbol. Instead of sending or receiving one specific discrete signal that represents a data symbol one will send or receive a sequence of (in this case) binary symbols. The generated sequence consists of multiple symbols (also called chips), as opposed to the single data element, and it is said that the signal is 'spread'.

To enable correct reception of the spreaded data elements each of the original data elements has to be coded by a different sequence, so that at the receiving end it can be determined which data symbol was sent. If different users of a transmission system occupy the same physical channel (such as in radio communications), then distinguishing between the symbols from each individual user requires the assignment of different sequences for the each symbol sent by each user. In present systems, the data symbols are generally binary (0 or 1) and the representing sequences also consist of binary symbols.

A common system for detecting the presence of a certain sequence in a received signal is by way of correlation. This method involves the generation of the to be detected sequence at the receiving end, and comparing this locally generated sequence with the received signal.

The principle of correlation between two sequences for detection and synchronization works in such as way that the assigned values of consecutive elements in two sequences will be multiplied and the result added to a sum. When two sequences are synchronized and identical the sum reaches a maximum value. When the two sequences are different or are not synchronized the sum ideally should be lower than when the sequences are identical and synchronized.

This discrete form of correlation is generally expressed in formula as:

$$C(j) = \frac{1}{N}\sum_{i=1}^{N} a_i a_{i+j}.$$

This expression determines the (normalized) autocorrelation of the sequence A with N elements $a_i$. For the (normalized) cross-correlation of two different sequences A and B with N elements $a_i$ and $b_i$ the following expression determines the cross-correlation:

$$C(j) = \frac{1}{N}\sum_{i=1}^{N} a_i b_{i+j}$$

The correlation method can be used to synchronize the locally generated sequence with a known received sequence by "searching" for an alignment wherein the correlation value between the two sequences has or exceeds a certain value.

The correlation method can also be used for detection of a certain sequence when it is part of a received sequence. In that case synchronization of the locally generated sequence with the received sequence should be assured. Also the correlation value of the received and the locally generated sequence should be equal to or exceed a certain value when the two sequences are identical.

Such a system for receiving and detecting sequences is less sensitive to noise and errors when the correlation value is high when sequences are synchronized and identical and very low when sequences are different or not synchronized. The known way to achieve a certain correlation performance is to use a selected group of binary sequences, wherein the autocorrelation shows a single high peak and the crosscorrelation is low. It is known from the literature that binary m-sequences or pseudo-random sequences have such a performance.

The present approach limits the number of usable sequences in applications such as communication systems. There is a need for a method to detect sequences that do not comply with certain statistical requirements. Such a novel method is one aspect of the present invention.

The properties of pseudo-random and other digital sequences are documented and widely used in present communication systems. It may be necessary (for instance for security reasons or in heavily congested situations) to make sequences look more alike and less distinguishable for present methods, while still being able to distinguish between the sequences. This is another aspect of the present invention.

A novel way is to increase the correlation value when elements are identical and subtract a higher value when elements are not equal. This method was described by the inventor in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA and in U.S. Non-Provisional patent application Ser. No. 11/065,836 filed Feb. 25, 2005, entitled GENERATION AND DETECTION OF NON-BINARY DIGITAL SEQUENCES; both are incorporated herein by reference.

A novel way to determine and improve the correlation performance for detection of sequences is one aspect of the present invention.

It is clear to the inventor that detection of a sequence is determining if a received sequence has a certain number of elements in a certain order. Correlation methods in essence execute only one part of that process: it determines if a received sequence has the same number of certain elements as the to be detected sequence.

Binary maximum length or m-sequences have an equal or almost equal number of '0' and '1' symbols. Their distribution over the sequence is such that there is only one position in the autocorrelation graph where all symbols are aligned. In all other shifted (or not-synchronized) positions there is almost an equal number or matching and non-matching symbols.

It should be clear that for binary sequences wherein either the '0' symbols or the '1' symbols dominate in a significant way the difference between the highest and lowest correlation values will be smaller than when the there are close to equal numbers of '0' and '1' symbols.

Binary sequences that 'look alike' or that have a relatively great number of identical symbols at corresponding positions are difficult to distinguish from each other. The present invention addresses these shortcomings and limitations in present and prior art.

Sequences presently used in spread-spectrum applications are predominantly of a binary nature. Also a sequence of binary symbols pre-dominantly represents a binary symbol. It is known that a sequence of m binary symbols can represent an n-valued symbol, for $n \leq 2^m$. This method of assigning more than 2 symbols to a sequence for one user is also known as Multi-coding.

It is another aspect of the present invention to provide a method to create and detect multi-code sequences.

SUMMARY OF THE INVENTION

In view of the more limited possibilities of the prior art in use in binary spread spectrum technology of certain sequences because they are too similar to others, one aspect of the current invention offers an improvement of distinguishing between sequences. Another aspect is limiting the effect of sequence errors.

The general purpose of the present invention, which will be described subsequently in greater detail, is to provide methods of multi-value coding of digital sequences, such as used in spread spectrum technology and improve sequence detection methods.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. The methods can be implemented in and executed by digital circuitry with or without A/D and D/A converters. The methods can also be executed by computer programs in micro-processors, digital signal processors or general computing equipment, with or without help of A/D and D/A converters. The methods can also be executed by multi-valued digital circuitry. For illustrative purposes binary symbols are represented as 0 and 1. A binary 0 may be multi-value coded as 0, 1 and 2 while a 1 may be multi-value coded as 4, 5 and 6. It should be clear that symbols represent logic states and not arithmetical numbers. Values may be assigned to states and used in correlation processes. However value assignments are arbitrary and may be selected on different preferences. Also, it is to be understood that the phraseology and terminology employed herein are for the purpose of the description and should not be regarded as limiting.

Multi-value and n-value in the context of this application mean a number n, with n being a positive integer greater than two. A primary object of the present invention is to provide a new method for transmitting and receiving binary and multi-value digital symbols in spread spectrum technology that will overcome the shortcomings of the prior art technology.

An object is to provide a method of multi-value coding of binary signals.

Another object is to apply multi-value coding of a binary signal to adjust the autocorrelation of a signal.

Another object is to apply multi-value coding of two binary signals to adjust the correlation between the two signals.

Another object is to use the method of multi-value coding of binary signals and correlation adjustment to make the differences between sequences more pronounced and consequently make it easier to distinguish between sequences.

Another object is to provide a method to create multi-code sequences.

Another object is to provide a method to detect a particular sequence in a multi-code sequence.

In accordance with another aspect of the present invention, a method of coding a first sequence of binary numbers to create a first sequence of multi-value numbers, is provided. In the method, each binary number in the sequence of binary numbers is sequentially evaluated as follows. If the binary number is the first 0 encountered, a 0 is placed in the first sequence of multi-value numbers. If the binary number is the second 0 encountered, a 1 is placed in the first sequence of multi-value numbers. If the binary number is the third 0 encountered, a 2 is placed in the first sequence of multi-value numbers, and the process then begins to look for the first 0 encountered when sequentially evaluating each binary number.

If the binary number is the first 1 encountered, a 3 is placed in the first sequence of multi-value numbers. If the binary number is the second 1 encountered, a 4 is placed in the first sequence of multi-value numbers. If the binary number is the third 1 encountered, a 5 is placed in the first sequence of multi-value numbers and the process then begins to look for the first 1 encountered when sequentially evaluating each binary number.

The previous multi-valued coding scheme for binary sequences is an example for illustrative purposes only. Different schemes to code 0s and 1s with multi-valued elements may be selected. This may include different lengths of 0s and/or 1s to be coded. Similar schemes can also be developed and applied to code n-valued sequences with p-valued elements with p greater than n.

BRIEF DESCRIPTION OF THE DRAWINGS

Various other objects, features and attendant advantages of the present invention will become fully appreciated as the same becomes better understood when considered in conjunction with the accompanying drawings, and wherein:

FIG. 19a shows a diagram of an LFSR based sequence generator;

FIG. 19b shows the matching descrambler for the circuit of FIG. 19a;

FIG. 20a shows a diagram of an LFSR based sequence generator;

FIG. 20b shows the matching descrambler for the circuit of FIG. 20a;

FIG. 21a shows a diagram of an LFSR based sequence generator;

FIG. 21b shows the matching descrambler for the circuit of FIG. 21a;

DETAILED DESCRIPTION AND PREFERRED EMBODIMENT OF THE INVENTION

Multi-value Coding of Binary Sequences and the Effect on Correlation

There are several methods to detect a sequence. Which one to use will be dictated by the statistical properties of the sequence or the way they are generated. It is clear to the inventor that detection of a sequence comprises determining if a received sequence has a certain number of elements in a certain order. Correlation methods in essence execute only one part of that process: they determine if a received sequence has the same number of certain elements as the to be detected sequence.

Correlation in essence ignores the order of elements. When correlation determines that two sequences have exactly the same number of different elements, it can be concluded that the two sequences are identical. When for instance 80% of the elements of two sequences are identical there is a chance that the sequences are identical, but that a certain number of elements where not correctly detected or experienced noise effects. However there is also a chance that the sequences were different, but just coincided on certain elements in such a way that a high correlation value was achieved.

A novel way to detect sequences is to increase the correlation value when elements are identical and decrease the correlation with a higher value when elements are not equal. This method was described by the inventor in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA.

Another novel way to determine and improve the correlation performance for detection of sequences is one aspect of the present invention. According to this aspect of the present invention the level of confidence in detecting a sequence can be improved by considering the order of elements in a sequence and not just the number of elements. This can be achieved by applying a multi-value coding method to both the sequence that is being received and to the locally generated sequence.

Further improvement of the correlation performance can be achieved by applying different correlation methods.

The method of multi-value coding of sequences will be explained by way of illustrative examples. It should be clear that these examples are for illustrative purposes only and do not limit the application or reach of the present invention.

Figure 1:
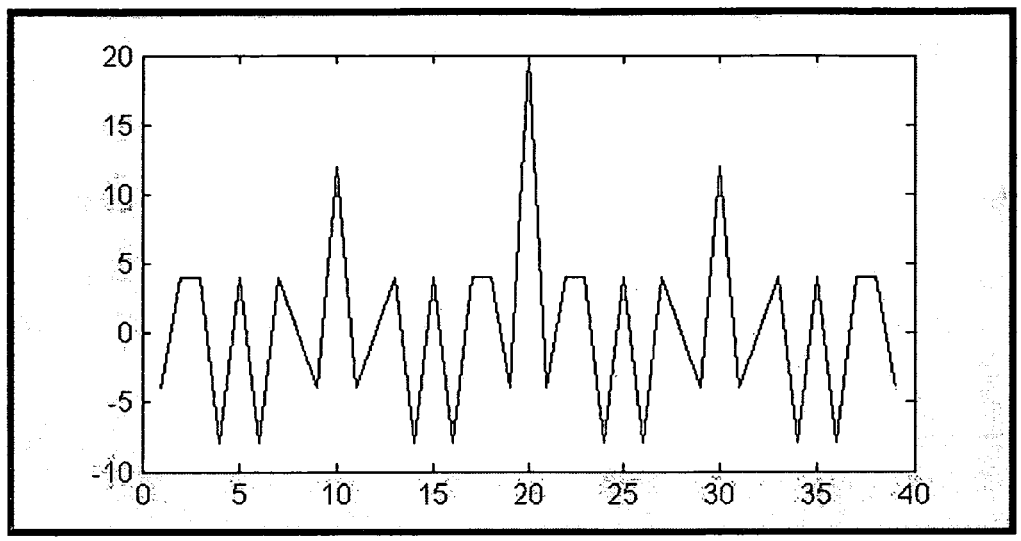
FIG. 1 is a graph showing an autocorrelation of a 20 elements binary sequence.

Assume the following binary sequence with 20 elements: bin=[1 0 0 1 0 1 1 1 1 1 0 0 1 0 1 1 0 1 0]. FIG. 1 shows the autocorrelation graph of this sequence. The correlation is determined by adding 1 to a sum when elements are identical and subtracting 1 when the elements are not identical.

Figure 2:
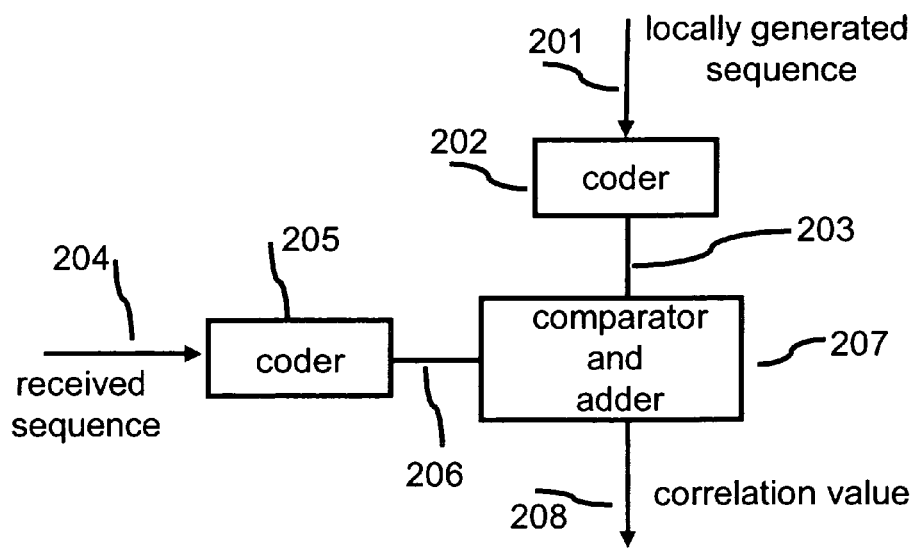
FIG. 2 is a diagram of a multi-value coding and correlation method.

The multivalue coding scheme is schematically shown in FIG. 2. A locally generated, to be detected sequence is inputted on an input 201 to a multi-value coder 202. The resulting multi-value coded sequence is outputted on input 203 of a comparator and adder 207. A received sequence is inputted on an input 204 of a multi-value coder 205. Multi-value coders 202 and 205 apply exactly the same multi-value coding method. The multi-value coder 205 outputs a multi-value coded sequence on input 206 to the comparator and adder 207. The comparator/adder 207 is reset at 0 at the start of a new detection cycle. A controlling clock may be used to determine the moment of coding, comparing and adding. After completion of the to be detected sequence, the sum available at output 208 reflects the correlation value between the two multi-value coded sequences.

One multi-value coding scheme can be the following:
1. code a first 0 as a 0
2. code a second 0 as a 2
3. code a third 0 again as a 0 etc.
a. code a first 1 as a 1
b. code a second 1 as a 3
c. code a third 1 again as a 1 etc.

According to the above coding scheme the sequence:
bin=[1 0 0 1 0 1 1 1 1 1 0 0 1 0 1 1 0 1 0] will be coded as
bin4=[1 0 2 3 0 1 3 1 3 1 3 2 0 1 2 3 1 0 3 2]

Figure 3:
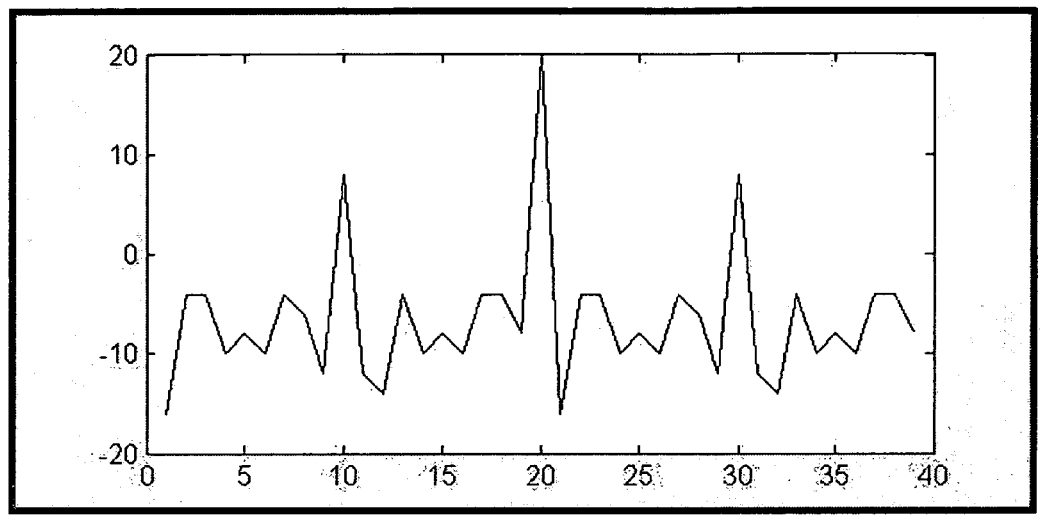
FIG. 3 is a graph showing the correlation according the method of FIG. 2 applying 4-value coding of the sequence used for FIG. 1.

One can create the correlation graph of bin4, based on the method that a 1 is added to the correlation value when elements are identical and 1 is subtracted when they are different. The correlation graph is shown in FIG. 3 and could be created by inputting sequence bin4 on 201 and inputting shifted versions of bin4 on input 204 of FIG. 2. It should be clear that this graph is not an autocorrelation graph of bin4. The reason for that is that every shifted version of bin will be coded by coder 205 in FIG. 2. A coded version of a shifted sequence is in many cases not the same as the shifted version of a coded sequence.

Figure 4:
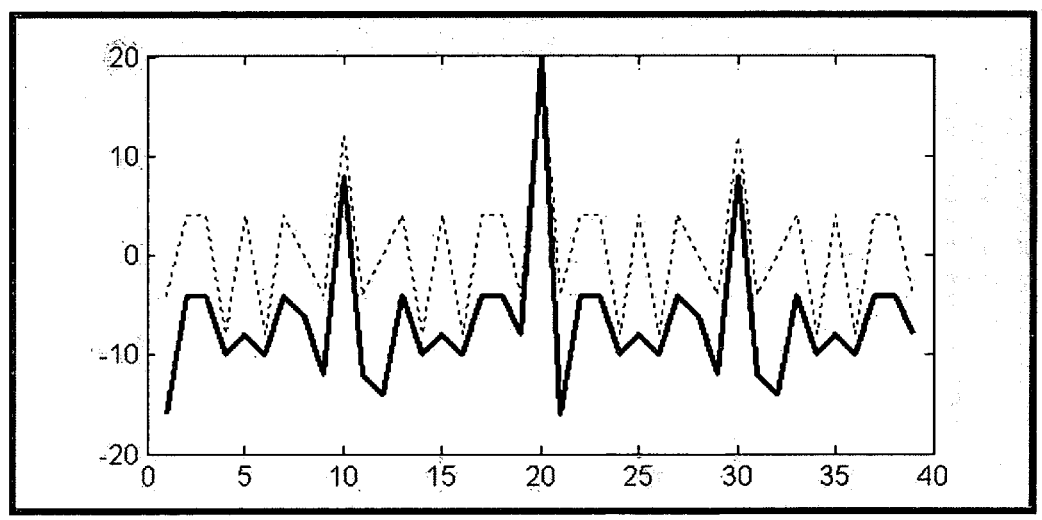
FIG. 4 shows a graph combining the graphs of FIG. 1 and FIG. 3.

FIG. 3 is the correlation graph between the 4-value coded sequence bin4 and the 4-value coded sequences of its shifted versions. FIG. 4 shows this graph combined with the auto-correlation graph of sequence bin. It shows that the 4-value coded sequence has a better correlation performance, though two sub-peaks (though lower than in the autocorrelation graph) still remain.

One can further improve the correlation performance by applying additional level of coding. For instance the sequence bin and its shifted versions can be coded using the following rules:
1. code a first 0 as a 0
2. code a second 0 as a 2
3. code a third 0 as a 4
4. code a fourth 0 again as 0 etc.
a. code a first 1 as a 1
b. code a second 1 as a 3
c. code a third 1 as a 5
d. code a fourth 1 again as a 1 etc.

By applying the above rules, the sequence
bin=[1 0 0 1 0 1 1 1 1 1 0 0 1 0 1 1 0 1 0]
will then be coded into:
bin6=[1 0 2 3 4 5 1 3 5 1 3 0 2 5 4 1 3 0 5 2]

Figure 5:
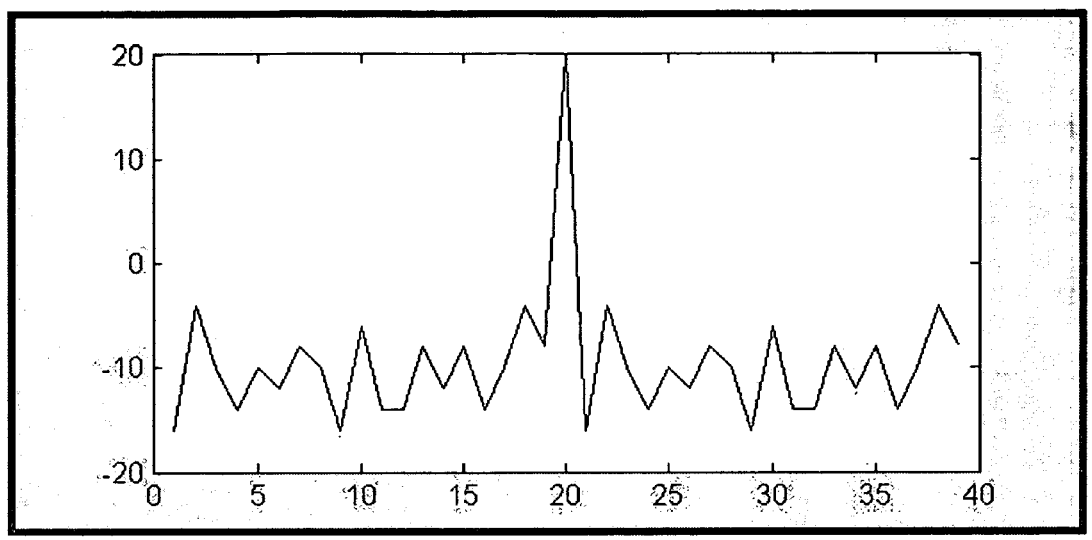
FIG. 5 is a graph showing the correlation of the 6-value coded binary sequence used for the graph of FIG. 1.
Figure 6:
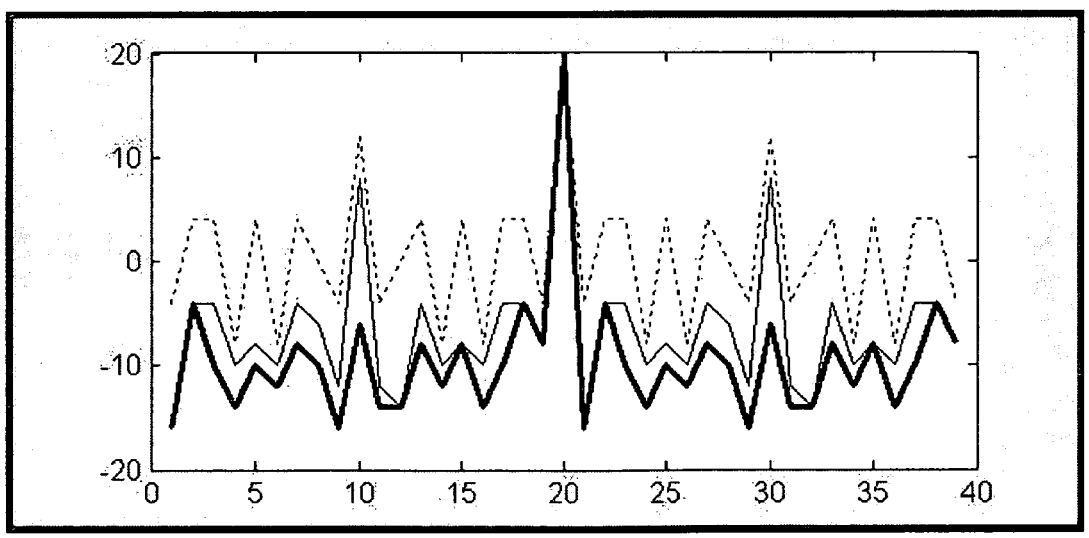
FIG. 6 shows the combination of the correlation graphs for the uncoded, the 4-value coded and the 6-value coded binary sequence.

FIG. 5 provides the correlation graph of the 6-value coded binary sequence applying the approach as provided schematically in FIG. 2. It shows that the two sub-peaks have almost disappeared and except for the synchronization peak, all other correlation values are well below 0. FIG. 6 provides the combined graphs of the binary (uncoded) correlation, the 4-value coded correlation and the 6-value coded correlation.

The examples apply a symmetrical coding mechanism, wherein both the 0 and the 1 symbols are coded into an equal number of additional states. This is not necessary or always desirable and depends on the statistical qualities of the binary sequences.

For instance one can design the following 4-value coding rule:
1. all 0 will be coded as a 0
2. a first 1 will be coded as a 1
3. a second 1 will be coded as a 2
4. a third 1 will be coded as a 3
5. a fourth 1 will again be coded as a 1 etc.

The result of applying this coding rule to the binary sequence:
bin=[1 0 0 1 0 1 1 1 1 1 0 0 1 0 1 1 0 1 0] will create
bin41=[1 0 0 2 0 3 1 2 3 1 2 0 0 3 0 1 2 0 3 0]

Figure 7:
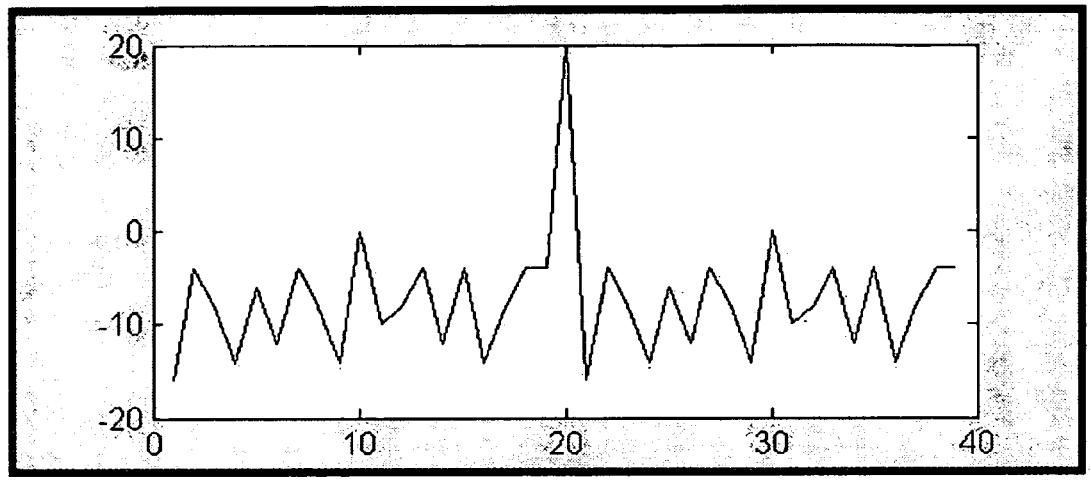
FIG. 7 shows the correlation graph of an asymmetrical 4-value coded binary sequence.

The correlation graph of the sequence bin41 with a shifted and then coded version of bin is shown in FIG. 7. Compared to the correlation graph shown in FIG. 4, which is the result of a different 4-value coding scheme, this correlation graph shows a better performance, as is has no significant sub-peaks.

The correlation of a coded sequences with a shifted and then coded version of itself is important for positive detection (or synchronization). However it is also important to prevent a "false" detection. This means that sequences that are coded and correlated with and different from a locally generated and multi-value coded sequence should generate a low correlation value.

One advantage of comparing two non-binary sequences is that there are more and different possible combinations between elements. In a binary system the only 'not equal' combination is {0,1}, which is treated the same as {1,0}. In a ternary coding with elements 0, 1 and 2 the 'not equal' combinations are: {0,1}, {0,2} and {1,2}. As explained in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA one can use the different combinations to affect the correlation when two elements are not equal.

One can apply this method also to situations when elements of two multi-value sequences are equal, and add a number that represents the value of the element. This can greatly enhance the peak value of the correlation graph. However it also enhances unwanted peaks in the correlation graph.

In order to demonstrate the effects of multi-value coding of binary sequences and the effects of different correlation methods the two following sequences will be auto-correlated and cross-correlated with each other using the here invented methods.
bin=[1 0 0 1 0 1 1 1 1 1 0 0 1 0 1 1 1 0 1 0]
bin2=[1 1 0 1 0 0 1 0 1 0 1 1 1 1 0 0 1 0 1 1]

Figure 8:
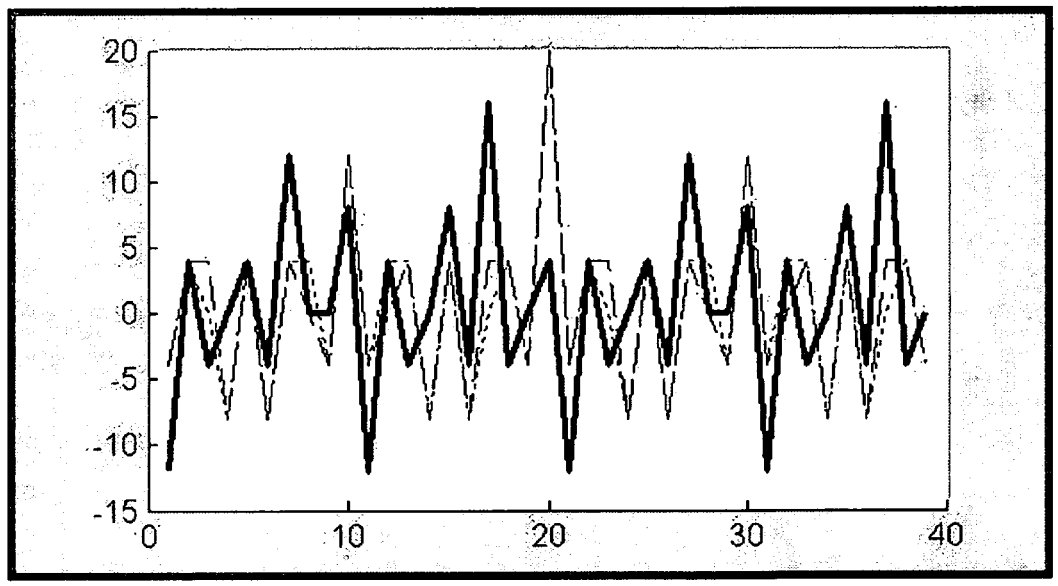
FIG. 8 is a graph showing the cross-correlation between two binary sequences.

FIG. 8 shows the correlation graphs for the two binary sequences, using a standard correlation scheme by adding 1 when two elements are identical and subtracting 1 when they are different. The cross-correlation graph is the thick solid line, superimposed on the thin lines showing the individual autocorrelation graphs. The cross-correlation has high peaks, almost as large as the synchronized correlation peak. This is not very attractive for detection use.

Figure 9:
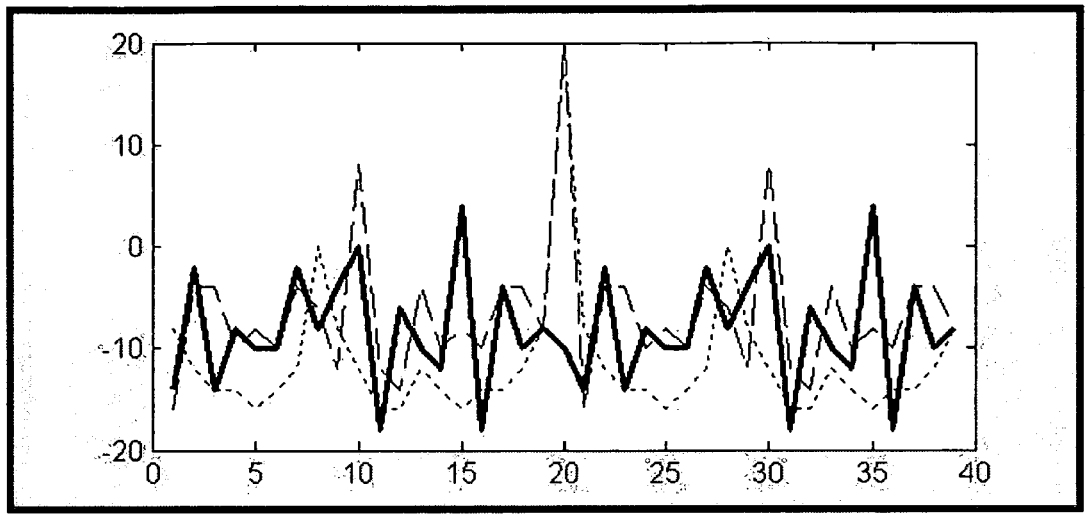
FIG. 9 is a graph combining the correlations of individual and between two 4-value coded binary sequences.

FIG. 9 shows the correlation graphs for the two sequences applying the symmetrical 4-value coding method for the two binary sequences. The thick line again shows the cross-correlation, which is much better than the previous case. The thin lines are the individual correlation graphs using 4-value coding. The peaks in the cross-correlation graphs have diminished substantially, so the chance to make a 'wrong' decision between detecting the two sequences has diminished also.

Figure 10:
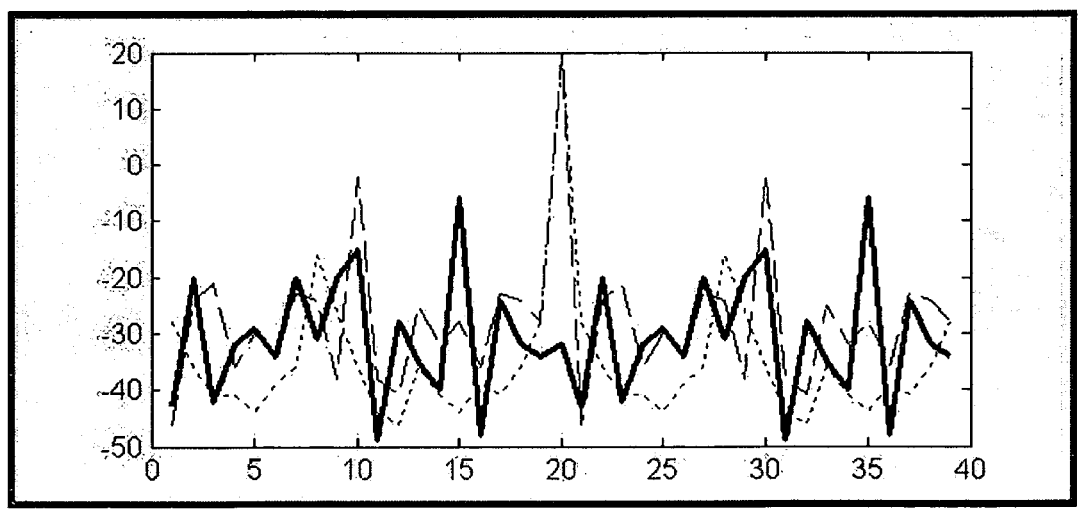
FIG. 10 is graph showing the correlation of the 4-value coded sequences of FIG. 9 using a different correlation method.

One can apply the correlation method wherein a 1 is added when elements are identical and the value of the compared to element is subtracted when the elements are different. It should be clear that this method does not make a difference in the binary case. However in the 4-value case it makes a significant difference as shown in FIG. 10. The solid thick line is again the cross correlation between the 4-value coded binary sequences. All cross-correlation values are now less than 0. This means that a combination of multi-value-coding combined with novel correlation methods can significantly improve performance for detection of certain (perhaps initially considered undesirable) sequences.

Effect of Element Errors.

It is known that disturbances such as noise may affect signals. The disturbance can be so severe that a signal may not be detected correctly. For instance a 0 may be detected at the receiver as a 1 or a 1 may be detected as a 0. The error performance of a digital (binary) channel is usually expressed as a bit-error-ratio (or BER). It may be assumed that channel BERs are better than 1 in 1000. However if a data element is represented in sequences of a length of 1000 or more, then the effects of a BER on the detection may be significant. An error in a sequence element may occur at the beginning of a sequence. This means that the whole sequence may be 4-value coded in such a way that it will not be detected in the correlation phase.

A way to prevent that is to allow multi-value coding run for only a limited number of sequence elements and reset the starting point of the coding process. This means that the effect of a bit error in a received sequence will be limited to the single coding run where the error occurred. It should be clear that sequences like bin and bin2 will not perform well with 4-value coding under occurrence of errors even with limited coding runs. To demonstrate the effect of errors and coding runs the following two 50 bit sequences will be used:
binnew=[0 1 0 1 1 1 0 1 0 1 0 0 0 1 1 0 1 0 0 1 1 1 0 1 0 0 1 0 1 1 1 0 1 1 0 0 1 0 1 1 1 1 1 0 0 1 0] and
binnen=[1 1 1 1 0 1 0 0 0 1 0 1 0 0 0 1 0 1 1 1 0 0 1 0 1 0 1 1 1 0 0 1 0 1 1 0 0 0 1 1 1 1 0 0 0 1 0 1 1 0]

Assume that an error occurs in the first bit of the sequence binnen. Instead of a 1 a 0 is detected. If the 4-value coding run is not limited the error will propagate through the whole sequence. The selected length of the 4-value code run depends on the expected error ratio and the statistical properties of the binary sequences. If the code run length is too short the distinguishing properties of the method will be diminished. If the length of the code run is too long, then errors in the beginning of a sequence will severely affect the ability to still detect the sequence when it is in the proper synchronization phase with the locally generated sequence.

The 4-value symmetrically coded versions of the sequence binnen and of binner (being binnen with an error in the first bit) are shown:
binnen=[1 1 1 1 0 1 0 0 0 1 0 1 0 0 0 1 0 1 1 1 0 0 1 0 1 0 1 1 1 0 0 1 0 1 1 0 0 0 1 1 1 1 0 0 0 1 0 1 1 0]
binner=[0 1 1 1 0 1 0 0 0 1 0 1 0 0 0 1 0 1 1 1 0 0 1 0 1 0 1 1 1 0 0 1 0 1 1 0 0 0 1 1 1 1 0 0 0 1 0 1 1 0]
4-value coded with 25 elements coding run:
binnen4=[1 3 1 3 0 1 2 0 2 3 0 1 2 0 2 3 0 1 3 1 2 0 3 2 1 0 0 1 3 2 0 1 2 3 1 0 2 0 3 1 3 1 2 0 2 3 0 1 3 2]
binner4=[0 1 3 1 2 3 0 2 0 1 2 3 0 2 0 1 2 3 1 3 0 2 1 0 3 0 0 1 3 2 0 1 2 3 1 0 2 0 3 1 3 1 2 0 2 3 0 1 3 2]

Figure 11:
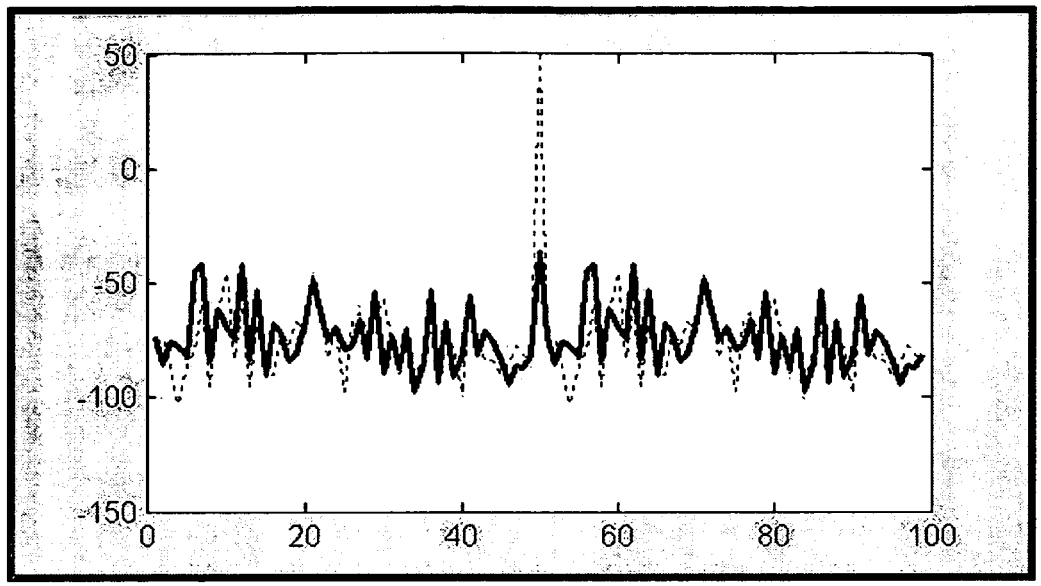
FIG. 11 is graph showing the correlation of 4-value coded binary sequences, wherein the second sequence is a copy of the first sequence with an inverted first element.

The correlation method (using add 1 when identical and subtract the value of the compared to element when different) applied to the autocorrelation of binnen4 and the correlation between binnen4 and a shifted and then coded version of binner will generate the correlation graphs as shown in FIG. 11. The thin dotted line shows the autocorrelation of binnen4. The thick line shows the correlation between the coded version of binnen and the coded version of the shifted version of binner. It clearly shows that the coding method discriminates very well. However in this case such discrimination is not desirable.

Figure 12:
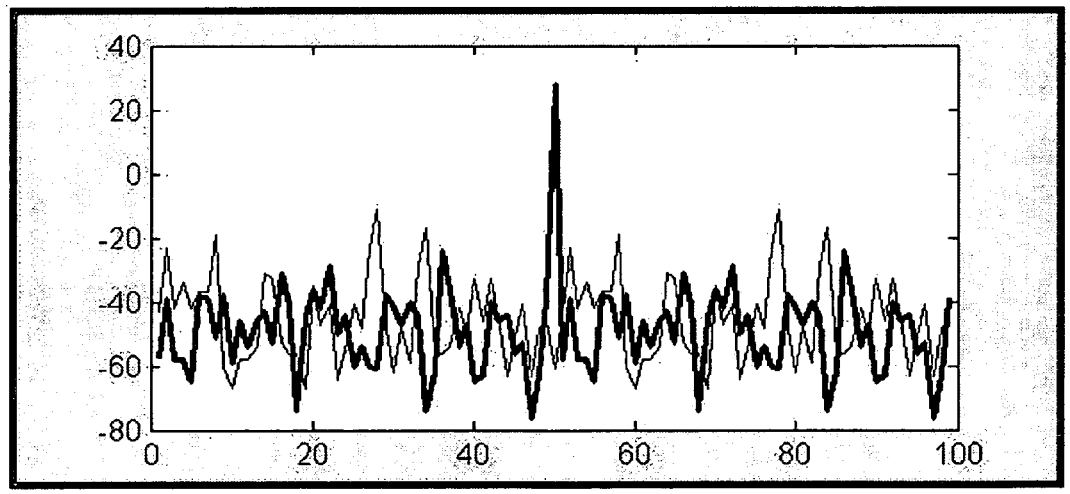
FIG. 12 is a graph of the 4-value coded sequences of FIG. 11 with a limited coding run of 6 elements.

A balance can be found in reducing the coding run to 6. The resulting correlation between sequences binnen and binner is shown in FIG. 12 as the thick line. The synchronization peak is lower than the 50 which would be found when no error would have happened. However the peak is still significantly higher than the other correlation values. The correlation between binner and binnew is shown in FIG. 12 as the thin line. The peaks of these values are higher than when no error would have happened. However they are still significantly below 0 and should not cause detection mistakes.

Multi-Value Coding Schemes.

Several multi-value coding schemes for binary sequences according to different aspects of this invention have been shown. It should be clear that other variants and different multi-value coding schemes can be applied. Such schemes depend on the expected sequences, the statistical and error performance of the transmission channel, if independent means (like pilot or synchronization sequences) are available. For instance when the moment of synchronization is always known, the multi-value scheme can be strictly applied to distinguish between presence and absence of a sequence.

The presence of a sequence may be established by determining that other, known, sequences cannot be present. Knowledge or information about expected error performance can be used to determine the length of coding runs as well as correlation methods.

Higher-Value Coding of Multi-Value Sequences.

It should be clear that the process of higher-value coding according to the present invention can also be applied to non-binary sequences. For illustrative purposes higher-value coding will be applied to two 3-valued or ternary sequences. To those skilled in the art it should be clear that the methods here described can be applied to all sequences with n-valued elements and with n an integer greater than 2.

Assume the following 3-value or ternary sequences with 40 elements:
ter1=[0 1 2 2 1 0 0 0 1 2 1 2 2 0 2 1 0 1 1 2 1 1 0 2 1 2 0 2 2 2 2 1 1 0 1 2] and
terr=[2 1 1 0 2 1 2 0 2 2 2 2 1 1 0 1 0 0 0 2 2 2 1 1 0 2 2 1 1 0 1 2 0 1 0 0]

Figure 13:
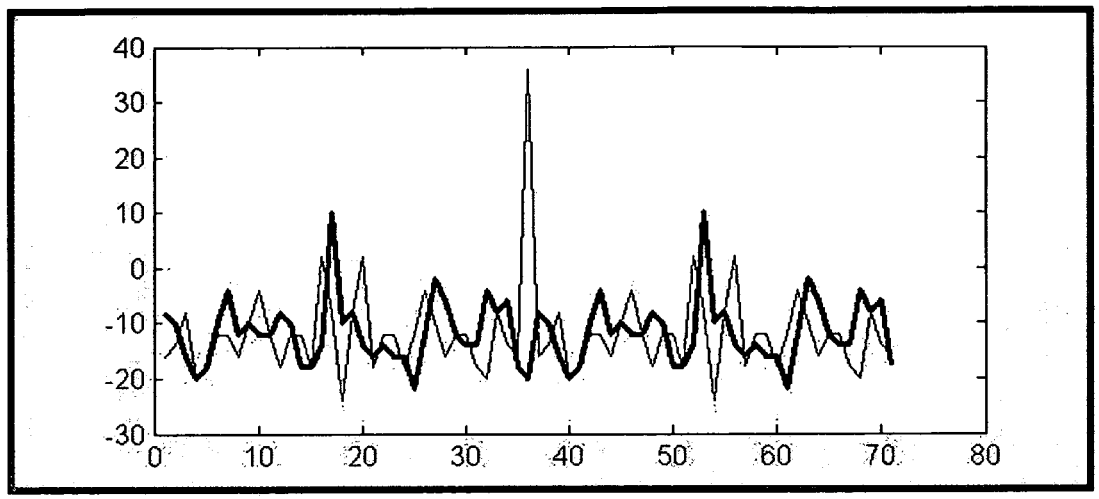
FIG. 13 is a graph showing the autocorrelation of one of two uncoded ternary sequences and the crosscorrelation between the two ternary sequences.

FIG. 13 shows the autocorrelation graph of ter1 in a thin line and the cross-correlation of ter1 and terr as the thick line. The applied correlation method is: add 1 when elements are identical, subtract 1 when they are different. The cross-correlation graph has peaks well above 0.

The following 6-value coding will be applied to ter1 and shifted versions of terr:
1. code the first 0 as 0
2. code the second 0 as 3
3. code the third 0 as 0 again etc.
a. code the first 1 as 1
b. code the second 1 as 4
c. code the third 1 as 1 again etc.
A. code the first 2 as 2
B. code the second 2 as 5
C. code the third 2 as 2 again etc.

The result of this coding scheme applied to ter1 and ter2:
ter16=[0 1 2 5 4 3 0 3 1 2 4 5 2 0 5 1 3 4 1 2 4 1 0 5 4 2 3 5 2 5 2 1 4 0 1 5] and
terr6=[2 1 4 0 5 1 2 3 5 2 5 2 4 1 0 4 3 0 3 5 2 5 1 4 0 2 5 1 4 3 1 2 0 4 3 0]

Figure 14:
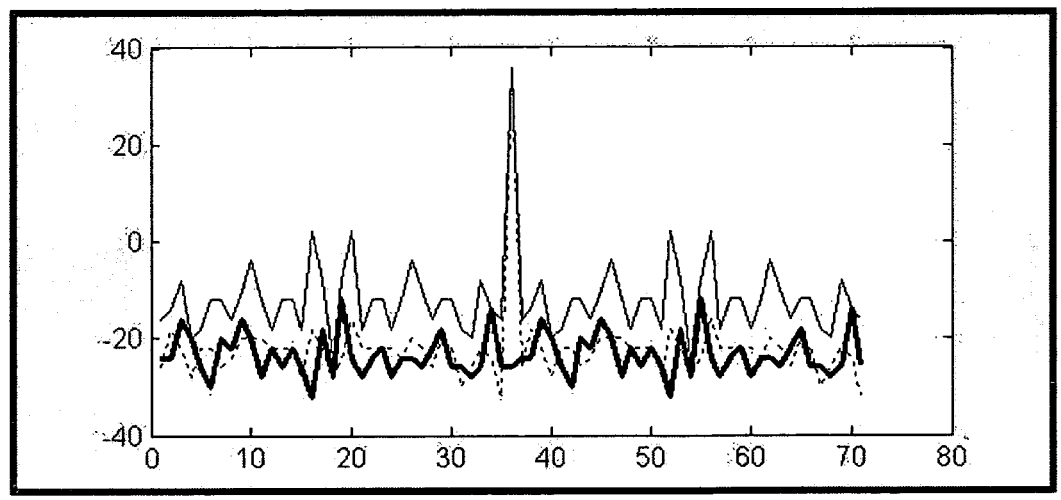
FIG. 14 is a graph of the correlation of the 6-value coded ternary sequences of FIG. 13.

FIG. 14 shows a combined correlation graph. The thin solid line is the ternary autocorrelation graph for ter1. The thin dotted line is the correlation graph for the 6-value coded sequence ter1 with shifted versions of itself and applying the correlation method: add 1 when elements are the same and subtract 1 when different. The solid thick line shows the correlation between the 6-value coded sequence ter1 and terr. The cross-correlation performance of the 6-value coded sequences is considerable better than between the original uncoded ternary sequences.

As many apparently different embodiments of this invention may be made without departing from the spirit and scope thereof, it is to be understood that the invention is not limited to the specific embodiments thereof. One embodiment of the creation of sequences representing non-binary symbols is by applying n-value gates and inverters and described in detail in provisional patent application 60/547, 683. It is known from the literature and previously granted patents (see, for example, U.S. Pat. No. 6,133,754) that it is possible to realize those specific devices (gates and inverters) in standard CMOS technology.

One embodiment of the execution of the multi-value coding of binary sequences is by applying and programming general Digital Signal Processors (or DSPs). All values can be represented and manipulated in binary form representing their respective required values.

Another embodiment is to realize the n-value devices in binary ROM or look-up devices with the inputs being transformed by Analog/Digital converters and the output by Digital/Analog converters.

Coding of Multi-Valued Symbols Into Binary and N-Valued Sequences.

Aspects of the present invention as described in this and following sections claims the benefit of U.S. Provisional Patent Application No. 60/575,948, filed on Jun. 1, 2004, entitled MULTI-VALUE CODING OF SEQUENCES AND MULTI-VALUE MEMORY DEVICES which is incorporated herein by reference.

Presently spread-spectrum sequences are predominantly binary in nature. Each individual sequence is different from other used sequences and represents a single binary data symbol. Spread spectrum sequences may be considered a code expansion of a symbol and contain a significant amount of redundancy.

Presently spread spectrum signals when received are matched with a locally generated copy of a corresponding sequence to determine the nature of the received sequence. If all or most of the elements (or chips) of the received sequence and the locally generated sequence match it is decided that the received sequence is identical to the locally generated sequence. A circuit will then generate the binary symbol that is represented by the received sequence.

One aspect of this invention provides a means to transmit higher information content per sequence. It does so by assigning a greater range of symbols to sequences and creating the composite sequence by using individually controlled gates. Instead of assigning just 0 or 1, it now adds (as an example) the symbol 2 as an assigned symbol to a sequence. This can be expanded to any number of symbols as long as sequences are available, which depends of course on the length of a sequence.

The method to assign more than two symbols to a binary sequence is known as Multi-code Direct Sequence Spread Spectrum technology or MC-DSSS spread. In general MC-DSSS sequences are selected to be orthogonal.

Figure 15A:
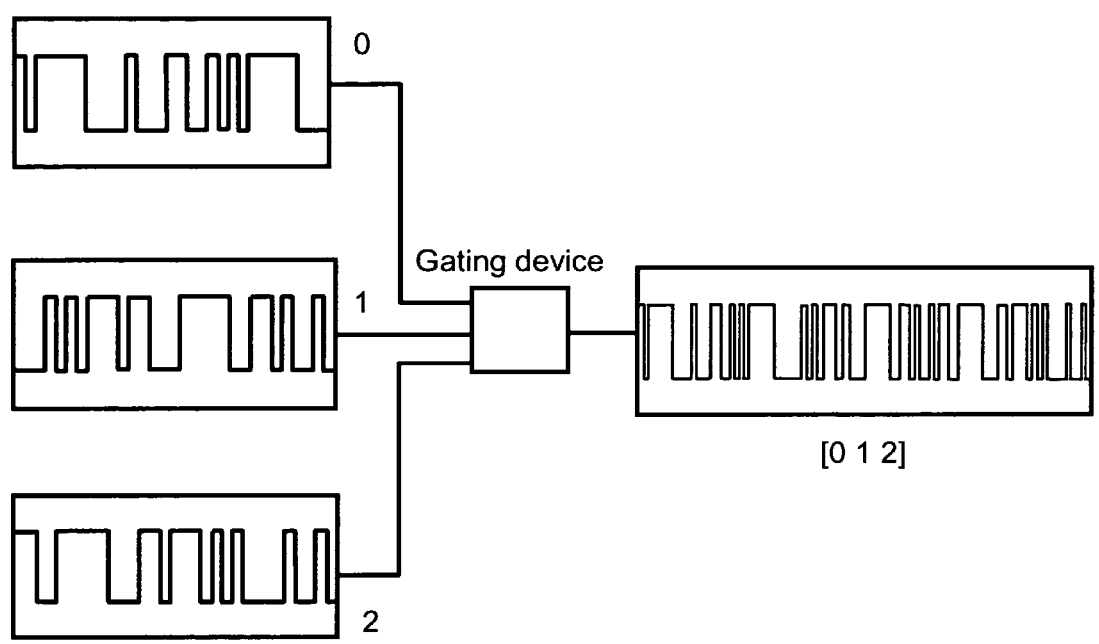
FIG. 15a shows a block diagram to generate a multi-code binary sequence.

The basic configuration for creating a sequenced binary signal representing three symbols is shown in FIG. 15a. There are three individual sequences, each representing one of three symbols. When the system detects a to be transmitted data symbol a gating device inserts the appropriate representing sequence into the to be transmitted signal.

Figure 15B:
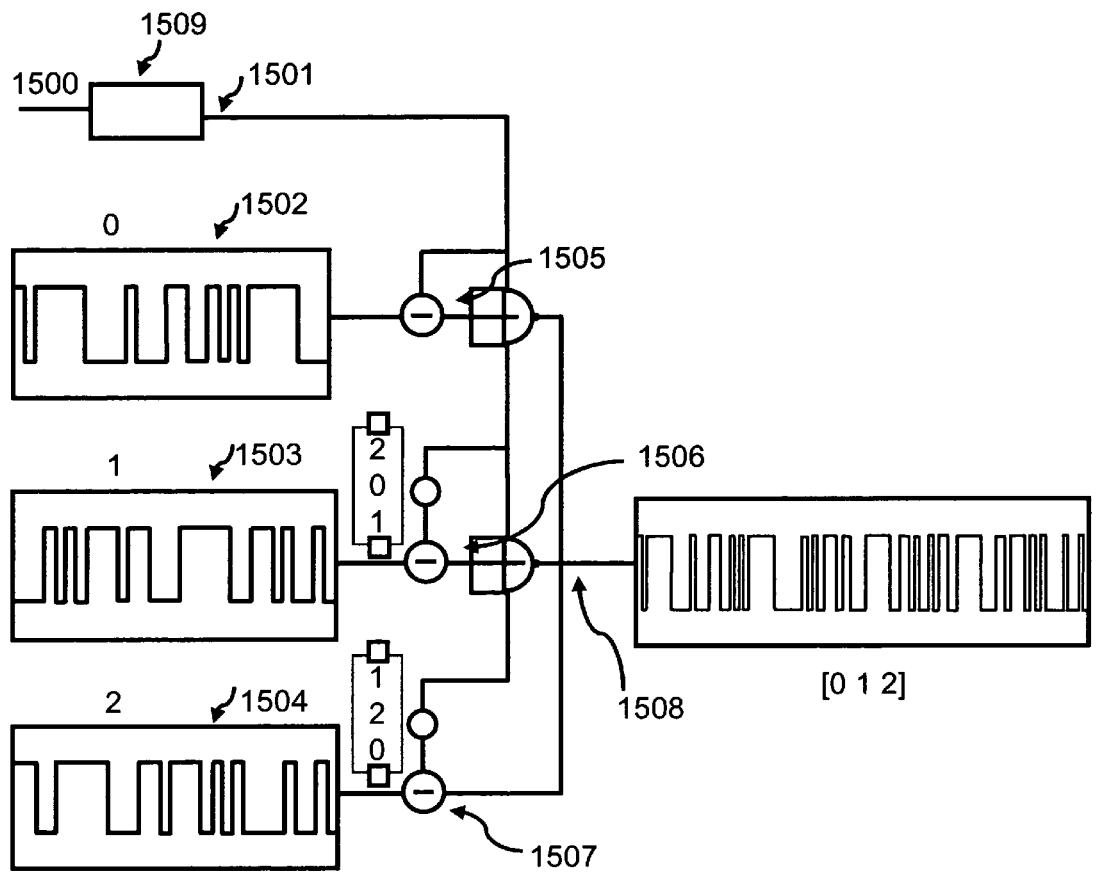
FIG. 15b shows the diagram of FIG. 15a with application of gates and inverters.

A more detailed picture is shown in FIG. 15b. This configuration applies the gates and inverters as described in U.S. Non-Provisional patent application Ser. No. 10/935, 960, filed on Sep. 8, 2004, entitled TERNARY AND MULTI-VALUE DIGITAL SCRAMBLERS, DESCRAMBLERS AND SEQUENCE GENERATORS and U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS, both of which are incorporated herein fully by reference.

Figure 16A:
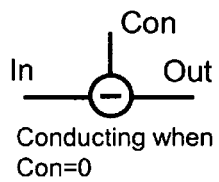
FIG. 16a shows a diagram of an individually controlled gate.
Figure 16B:
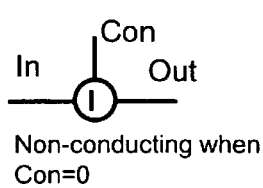
FIG. 16b shows another diagram of an individually controlled gate.
Figure 16C:
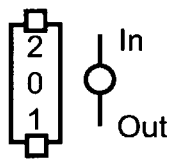
FIG. 16c shows a diagram of a ternary inverter.

A device 1509 in the diagram of FIG. 15b, possibly being a 4B3T coder, generating 3 ternary symbols from 4 binary symbols, creates a ternary signal on input 1501. Input 1501 provides a control signal to individually controlled gates 1505, gate 1506 and gate 1507. Details of this type of gate are shown in FIG. 16a. When a control signal Con on a control input is equal to 0, the gate conducts between an input In and an output Out. An inverter in the control input to gate 1506 assures that a signal 1 is transformed into a 0, as is shown in FIG. 16c. This means that when the signal provided on 1501 in a 1 then only the gate 1506 is conducting and the signal generated by 1503 will be outputted on 1508.

Figure 16D:
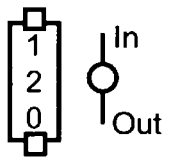
FIG. 16d shows another diagram of a ternary inverter.

The control input to gate 1507 has an inverter that will transform a 2 into a 0. This inverter is shown in FIG. 16d. This means that when the signal provided by 1501 is a 2 then only gate 1507 is conducting and the sequence generated by 1504 will be outputted on 1508.

When the signal provided by 1501 is 0 then only gate 1505 is conducting and the sequence generated by 1502 will be outputted on 1508.

Consequently when a certain data element is present on 1501 it automatically opens the corresponding gate and allows the corresponding sequence to be inserted for transmission on output 1508.

The relevant clock signals have been omitted to limit complexity of the figures. However in certain configurations clock signals have to be applied to ensure that start of a data-symbol and the beginning of its corresponding sequence coincide.

It should be clear that this approach can be expanded to any n-valued symbol sequence insertion, provided sufficient distinguishing sequences are available.

The approach can also be used to create composite n-valued sequences representing m different symbols.

Figure 17:
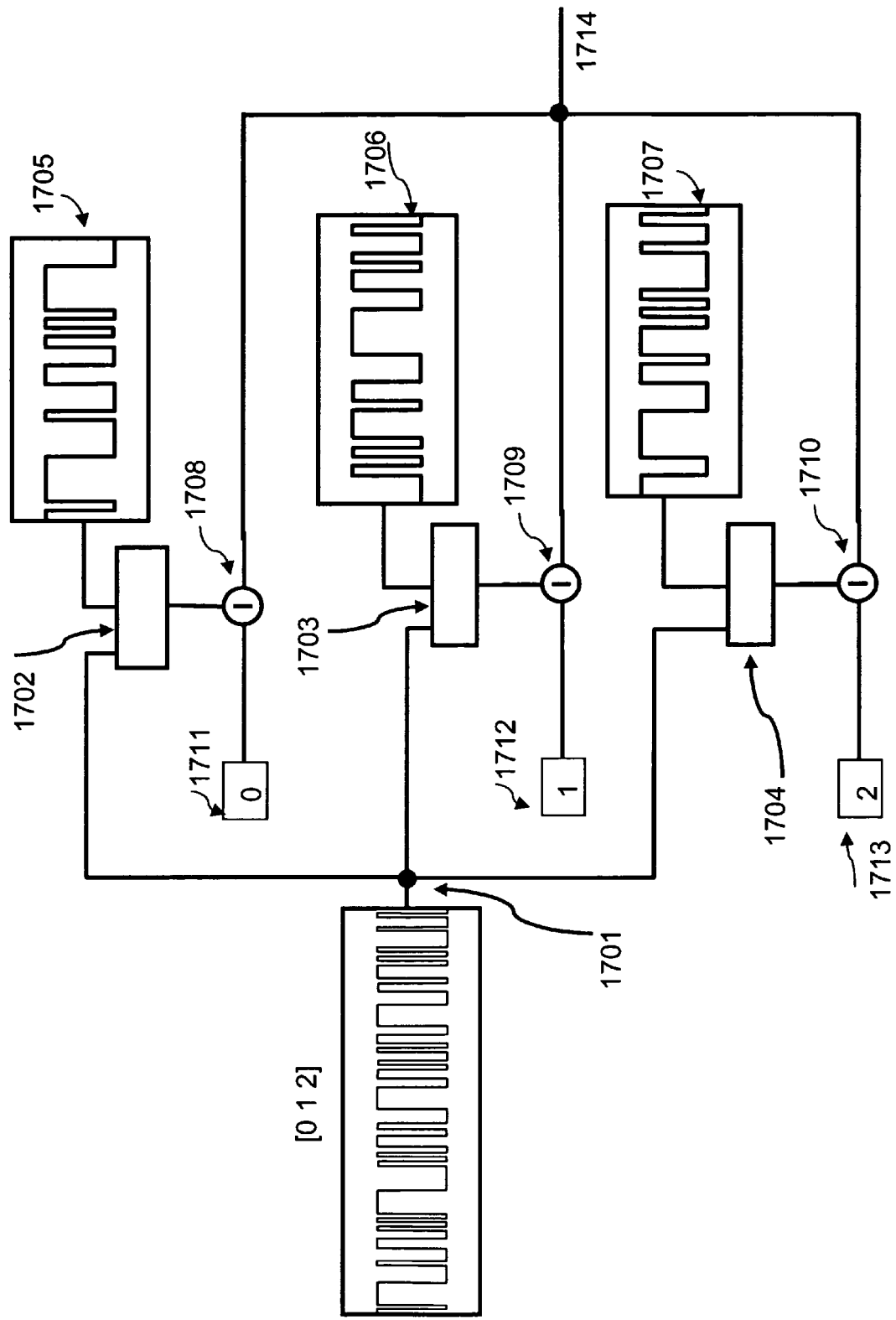
FIG. 17 shows a diagram of a multi-code sequence detector applying correlators.

A possible configuration for the detection and generation of the recovered data signal by way of correlation is shown in FIG. 17. It is assumed that all sequences are synchronized and that the start position of all relevant sequences can be determined unambiguously. There are known ways to achieve that.

A received sequence, representing a plurality of symbols is provided in the circuit of FIG. 17 on input 1701. The signal on this input is provided to three different correlation units 1702, 1703 and 1704. Unit 1702 correlates the received sequence with sequence 1705, representing symbol 0. When this sequence is detected as being present in the sequence provided by 1701 then the correlation unit 1702 generates a signal not equal to 0, thus making gate 1708 (which is shown in detail in FIG. 16b) conducting. When 1708 is conducting it will provide a signal representing a ternary symbol 0 from source 1711 on output 1714.

Unit 1703 correlates the sequence provided on 1701 with sequence 1706, representing symbol 1. When this sequence is detected as being present in the sequence provided by 1701 then the correlation unit 1703 generates a signal not equal to 0, thus making gate 1709 (which is shown in detail in FIG. 16b) conducting. When 1709 is conducting it will provide a signal representing a ternary symbol 1 from source 1712 on output 1714.

Unit 1704 correlates the sequence provided by 1701 with sequence 1707, representing symbol 2. When this sequence is detected as being present in the sequence provided by 1701 then the correlation unit 1704 generates a signal not equal to 0, thus making gate 1710 (which is shown in detail in FIG. 16b) conducting. When 1710 is conducting it will provide a signal representing a ternary symbol 2 from source 1713 on output 1714.

The gates and circuits are governed by a clock signal to control the duration of the data signal. These clock signals have been omitted in the figure to avoid making it too complex. It should be clear for those skilled in the art where and how the clock signals have to be applied.

The need for clock signals and use of multiple correlators can make the generation and detection of multi-code signals expensive. For correlation it is required that to be detected sequences are in phase with the locally generated sequence.

Another aspect of the invention is to apply the method for sequence detection as described in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA and U.S. Non-Provisional patent application Ser. No. 11/065,836, filed Feb. 25, 2005, entitled GENERATION AND DETECTION OF NON-BINARY DIGITAL SEQUENCES, both of which are incorporated herein fully by reference.

Figure 18:
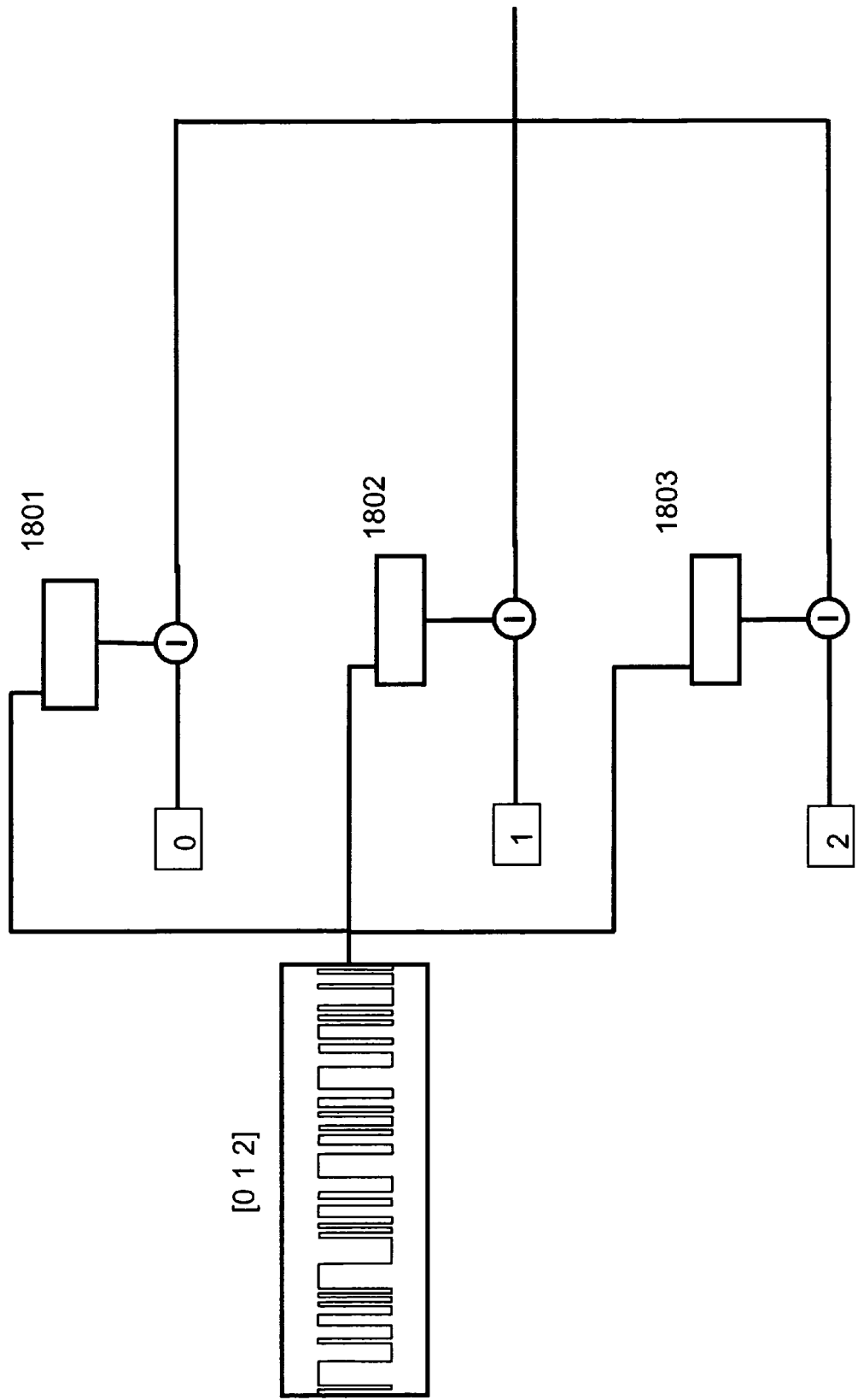
FIG. 18 shows a diagram of a multi-code sequence detector applying descramblers.

The methods describe how a sequence generated by a Linear Feedback Shift Register (LFSR) based sequence generator can be detected by a related LFSR based descrambler. A block diagram of the detector is provided in FIG. 18. This circuit provides the same function as the one in FIG. 17. However the correlators have been replaced by detectors 1801, 1802 and 1803. The individual detectors comprise a LFSR based descrambler and circuitry that will generate a pre-determined signal when a sequence with certain number of identical symbols has been detected.

For illustrative purposes again a ternary system will be used as an example. It should be clear that this can be expanded to any n-valued solution.

FIG. 19a shows a diagram of a LFSR based 5-element binary sequence generator. This sequence generator can be described by the irreducible polynomial of degree 5: $x^5+x^2+1$. The circuit has a feedback tap at the third element of the shift register into a XOR device 1901. The generated binary sequence is provided on output 1902.

FIG. 19b shows a descrambler that will descramble the sequence provided by the generator of FIG. 19a. The descrambler is a mirrored image of the generator of FIG. 19a with a feedback tap into a XOR function 1904 from the third element of the shift register. Also added is a binary device 1903 at the output 1906 of the descrambler executing the binary EQUAL function on the received sequence and the sequence leaving the descrambling unit. When the signal provided on input 1905 is generated by the circuit of FIG. 19a and the initial content of the shift registers of generator and descrambler are equal, then the signal generated on 1906 will be all 1s. When the initial contents are not the same only the first 5 detected symbols may be not identical to 1.

A simple detection mechanism is to count the number of is at the output 1906. If the number of 1s supersedes a predetermined number it may be assumed that the symbol represented by the specific sequence was detected.

In order to prevent false detections one should select the generators of sequences representing the other 2 symbols of the ternary set in such a way that they can be described by different irreducible polynomials of degree 5. For instance a 1 can be generated by an LFSR circuit as shown in FIG. 20a and described by: $x^5+x^3+1$. Its descrambler is shown in FIG. 20b. When the descrambler of FIG. 20b receives a sequence generated by circuit of FIG. 19a it will generate about 50% 0s and 50% 1s. When the descrambler of FIG. 20b receives a sequence generated by circuit of FIG. 20a it will generate a sequence of predominantly 1s, depending on the initial content of the shift register. There is sufficient distinction between predominantly all 1s with a sequence of about 50% 1s in for instance a sequence length of 31 elements to make a clear detection.

For instance a 2 can be generated by an LFSR circuit as shown in FIG. 21a and described by: $x^5+x^4+x^3+x^2+1$. Its descrambler is shown in FIG. 21b. When the descrambler of FIG. 21b receives a sequence generated by circuit of FIG. 19a or FIG. 20a it will generate about 50% 0s and 50% 1s. This is again sufficient different from all 1s to make a clear detection.

This aspect of the invention circumvents strict requirements for in-phase generation and in-phase detection of sequences, as at most a number of digits equivalent to the length of the shift register will not be equal to 1 at detection. It also eliminates the requirement to create locally generated copies of sequences for correlation purposes. It also allows keeping the generators running constantly in the circuit of FIG. 15 without having to be concerned about initializing the content of the shift register.

It should be clear that it is possible to apply the invention to create sequences representing 2 or more symbols and detect data symbols from sequences through descrambling.

The following patent applications, including the specifications, claims and drawings, are hereby incorporated by reference herein, as if they were fully set forth herein: (1) U.S. Provisional Patent Application No. 60/575,948, filed on Jun. 1, 2004, entitled MULTI-VALUE CODING OF SEQUENCES AND MULTI-VALUE MEMORY DEVICES; (2) U.S. Provisional Patent Application No. 60/668,355, filed Apr. 5, 2005, entitled IMPROVED SEQUENCE DETECTION BY MULTI-VALUE CODING, (3) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (4) U.S. Non-Provisional patent application Ser. No. 10/936,181, filed Sep. 8, 2004, entitled TERNARY AND HIGHER MULTI-VALUE SCRAMBLERS/DESCRAMBLERS; (5) U.S. Non-Provisional patent application Ser. No. 10/912,954, filed Aug. 6, 2004, entitled TERNARY AND HIGHER MULTI-VALUE SCRAMBLERS/DESCRAMBLERS; (6) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (7) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (8) U.S. Non-Provisional patent application Ser. No. 11/065,836 filed Feb. 25, 2005, entitled GENERATION AND DETECTION OF NON-BINARY DIGITAL SEQUENCES.

The invention claimed is:

1. A method of reversible coding a first sequence to a second sequence, the first sequence having n m-value symbols, each m-value symbol having one of m states with $m \geq 2$ and n>m, the first sequence having at least m m-value symbols with different states from each other and having an m-value symbol in a first state with α occurrences with α>1, comprising:
   applying a coding rule to each symbol in the first sequence to generate the second sequence such that the second sequence has n different n-value symbols; and
   each m-value symbol in a position in the first sequence being coded into an n-value symbol in a like position in the second sequence.

2. The method as claimed in claim 1, further comprising the steps:
   using a third sequence having r m-value symbols and r being greater than 1, each of the r m-value symbols having one of m states; and
   coding the third sequence into a fourth sequence having r n-value symbols, each n-value symbol having one of n states, by using the method as claimed in claim 1, and further including the step:
      coding a $k^{th}$ occurrence with $k \leq \alpha$ of an m-value symbol in the first of m states in the third sequence into an n-value symbol in the fourth sequence by selecting an n-value symbol in the second sequence occurring in a position in the second sequence identical to a position of the $k^{th}$ occurrence of the m-value symbol in the first state in the first sequence.

3. The method as claimed in claim 2, an m-value symbol in the first of m states having k>α it occurrences in the third sequence, further comprising the steps:
   calculating a $k^{th}$ occurrence of an m-value symbol in the first state in the third sequence as being equivalent to an m-value symbol in the first state in the first sequence in a position of a (k modulo-α)$^{th}$ occurrence in the first sequence whenever (k modulo-α) is not zero;
   calculating the $k^{th}$ occurrence of an m-value symbol in the first state in the third sequence as being equivalent to an m-value symbol in the first state in the first sequence in a position of an α$^{th}$ occurrence in the first sequence whenever (k modulo-α) is zero; and
   coding the $k^{th}$ occurrence of the m-value symbol in the first state in the third sequence into an n-value symbol in the fourth sequence in accordance with an equivalent position of an m-value symbol in the first sequence.

4. The method as claimed in claim 3, further comprising evaluating s of the symbols in the third m-value sequence, wherein $s \geq 2$, and treating the first occurrence of each of the m possible m-value symbols after evaluating the s symbols as appearing for the first time.

5. A method for determining a correlation number between a first and a second sequence of m-value symbols, comprising the steps of:
   coding the first and the second sequence into a third and fourth sequence of n-value symbols wherein n>m; and
   determining a correlation number between the third and the fourth sequence by evaluating each symbol in the third sequence with a symbol in a like position in the fourth sequence.

6. The method as claimed in claim 5, further comprising the steps:
   initiating a sum;
   evaluating a symbol in a first position of the third sequence and a symbol in a first position of the fourth sequence;
   adding a number to the sum when the evaluated symbols are identical;
   subtracting a number from the sum when the evaluated symbols are different;
   evaluating a symbol in a next position of the third sequence and a symbol in a next position of the fourth sequence;
   adding a number to the sum when the evaluated symbols in the next position of the third and fourth sequence are identical;
   subtracting a number from the sum when the evaluated symbols in the next position of the third and fourth sequence are different; and
   repeating the previous three steps until all symbols in the third and fourth sequence have been evaluated.

7. A method as claimed in claim 6, further comprising subtracting the number 0 from the sum when a symbol in a position in the third sequence is different from a symbol in a like position in the fourth sequence.

8. A method for coding a first sequence of r m-value symbols into a second sequence of r n-value symbols with $r \geq 2$, n>m and $m \geq 2$, comprising the steps:
   for each m-value symbol in the first sequence selecting a corresponding m-value symbol in a third sequence, wherein in the third sequence has n m-value symbols of which m m-value symbols have different states and one m-value symbol has a first state and appears p times with p>1;
   selecting from a fourth sequence an n-value symbol corresponding to an m-value symbol in the third sequence, the fourth sequence having n n-value symbols, each n-value symbol having a different state, and wherein an m-value symbol in a position in the third sequence uniquely corresponds to an n-value symbol in the fourth sequence in a like position; and
   generating in the second sequence an n-value symbol from an m-value symbol in the first sequence, by using an n-value symbol in the fourth sequence, generated from an m-value symbol in the third sequence which is the corresponding m-value symbol from the m-value symbol in the first sequence.

9. The method as claimed in claim 8, further comprising coding an m-value symbol in a position in the first sequence to an n-value symbol in the second sequence in a like position.

10. The method as claimed in claim 8, further comprising selecting for an m-value symbol in the first state in the first sequence occurring for a (p+1)$^{th}$ time a corresponding m-value symbol in the first state in the third sequence occurring for the first time in the third sequence.

11. The method as claimed in claim 8, further comprising selecting for an m-value symbol in the first state in the first sequence occurring for a (p+k)$^{th}$ time with 1<k<p a corresponding m-value symbol in the first state in the third sequence occurring for the k$^{th}$ time in the third sequence.

12. The method as claimed in claim 8, further comprising selecting for an m-value symbol in the first state in the first sequence occurring for a (t.p+1)$^{th}$ time with 1<k<p and t>1 a corresponding m-value symbol in the first state in the third sequence occurring for the first time in the third sequence.

13. The method as claimed in claim 8, further comprising selecting for an m-value symbol in the first state in the first sequence occurring for a (t.p+k)$^{th}$ time with 1<k<p and t>1 a corresponding m-value symbol in the first state in the third sequence occurring for the k$^{th}$ time in the third sequence.

* * * * *